United States Patent
Lin

(10) Patent No.: US 6,857,198 B1
(45) Date of Patent: Feb. 22, 2005

(54) HOUSING OF MEASURING TAPE

(75) Inventor: Ping Lin Lin, Sanchung (TW)

(73) Assignee: Top-Long Industrial Co., Ltd., Sanchung (TW)

( * ) Notice: Subject to any disclaimer, the term of this patent is extended or adjusted under 35 U.S.C. 154(b) by 0 days.

(21) Appl. No.: 10/654,479

(22) Filed: Sep. 4, 2003

(51) Int. Cl.$^7$ .................................................. G01B 3/10
(52) U.S. Cl. ........................................ 33/769; 33/761
(58) Field of Search ...................... 33/769, 755, 761, 33/768, 771

(56) References Cited

U.S. PATENT DOCUMENTS

| | | | | |
|---|---|---|---|---|
| 4,574,486 A | * | 3/1986 | Drechsler | 33/755 |
| 4,908,954 A | * | 3/1990 | Johnson | 33/768 |
| 4,931,366 A | * | 6/1990 | Mullaney, Jr. | 33/769 |
| 5,020,235 A | * | 6/1991 | Martin | 33/768 |
| 5,079,851 A | * | 1/1992 | Sill | 33/768 |
| 5,459,942 A | * | 10/1995 | Hintz, Jr. | 33/768 |
| 5,746,004 A | * | 5/1998 | Wertheim | 33/769 |
| 6,148,534 A | * | 11/2000 | Li | 33/769 |
| 6,182,916 B1 | * | 2/2001 | Lin | 33/761 |
| 6,226,886 B1 | * | 5/2001 | Lamond et al. | 33/769 |
| 2003/0167651 A1 | * | 9/2003 | Pedersen | 33/768 |
| 2003/0204966 A1 | * | 11/2003 | Hsu | 33/769 |
| 2003/0233762 A1 | * | 12/2003 | Blackman et al. | 33/769 |

* cited by examiner

Primary Examiner—Christopher W. Fulton
Assistant Examiner—Travis Reis
(74) Attorney, Agent, or Firm—Leong C. Lei

(57) ABSTRACT

A housing of measuring tape compromising a supporting a hard plastic shell, a buffer soft plastic shell and two impact proof side metal covers, the supporting hard plastic shell and the buffer soft plastic shell can be injected together or stuck together after being injected separately for the right, left body of the measuring tape. During assembling, screws are applied in both directions to have the tape wheel, the elastic component, the tape lock/automatic rewind switch and all the components installed inside the right, left body, then to have the impact proof side metal covers installed on both external sides of the right, left body. The screw holes are covered by the impact proof side metal covers, such structure make the housing with light weight, impact proof and not easy to disperse characters.

1 Claim, 5 Drawing Sheets

HOUSING OF MEASURING TAPE

BACKGROUND OF THE INVENTION

I. Field of the Invention

This invention relates generally to a housing of measuring tape and, more specifically, to a housing of measuring tape that made of hard and soft plastic materials in two layers and covered with two impact proof metal side covers for better protection and easy to manufacture.

II. Description of the Prior Art

Heretofore, it is known that the housing of most of the engineering measuring tapes in the market are made of hard plastic or metal.

The hard plastic housings can have the color of the plastic material as exterior decoration. Many manufacturers apply paint, electroplate to have the housings look like metal for better appearance. However, the painting, electroplating not only introduces environment hazard but also easy get scratches on the surface due to collision. While falling from higher ground or under heavy impact the plastic housing might get damage easily. The metal housings have smooth exterior with heavy weight that is not easy to hold and is tended to drop easily. The metal housings are strong and durable, however, the appearance is very difficult to have different variation.

Some manufacturers create double layer housing to have soft plastic material wraps over hard plastic. The hard plastic is the supporting structure while the soft plastic is the impact proof buffer. Such arrangement can fulfill light weight and impact proof requirement.

All the measuring tape housings mentioned above, regardless the manufacturing and technique, the structure is still in symmetrical assembly with screws design: apply right and left housing to pack the tape wheel, elastic component and tape lock/automatic rewind switch together internally. The screws might get loose by collision and swing in a long period of time. The whole structure might be broken and users might not be easy to assemble all the parts together.

SUMMARY OF THE INVENTION

It is therefore a primary object of the invention to provide a housing of measuring tape made of hard and soft plastic materials in double layers. The exterior is cover with two impact proof side metal covers. The appearance of the housing can be in different variety and protection of the impact proof side metal covers for stronger structure.

In order to achieve the object mentioned-above, the present invention provides a housing of measuring tape having a supporting a hard plastic shell, a buffer soft plastic shell and two impact proof side metal covers. The supporting hard plastic shell and the buffer soft plastic shell can be injected together or stuck together after being injected separately for the right, left body of the measuring tape. During assembling, screws are applied in both directions to have the tape wheel, the elastic component, the tape lock/automatic rewind switch and all the components installed inside the right, left body. Then to have the impact proof side metal covers installed on both external sides of the right, left body for a housing with light weight, impact proof and not easy to disperse.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
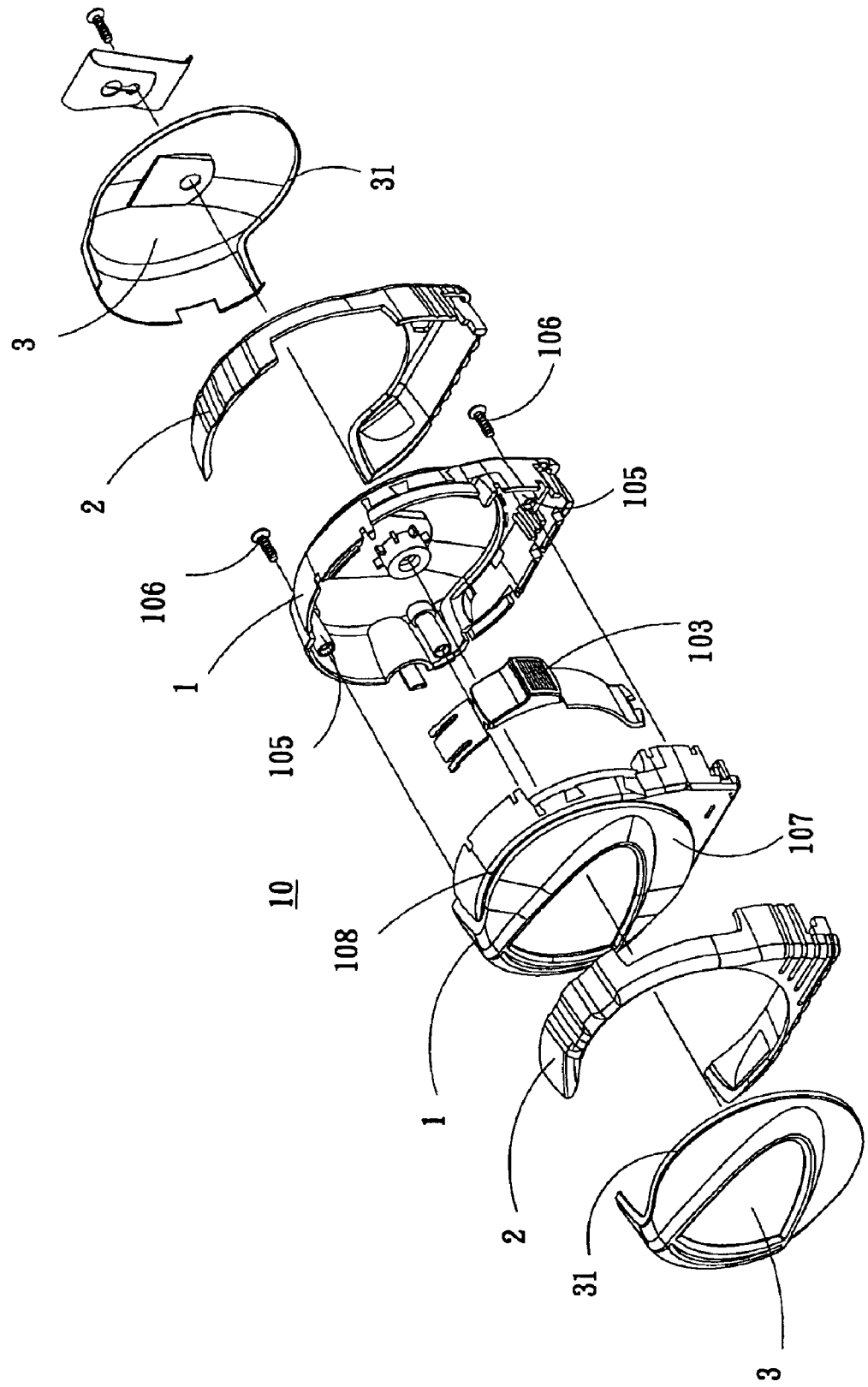
FIG. 1 is an assembly of the present invention.
Figure 2:
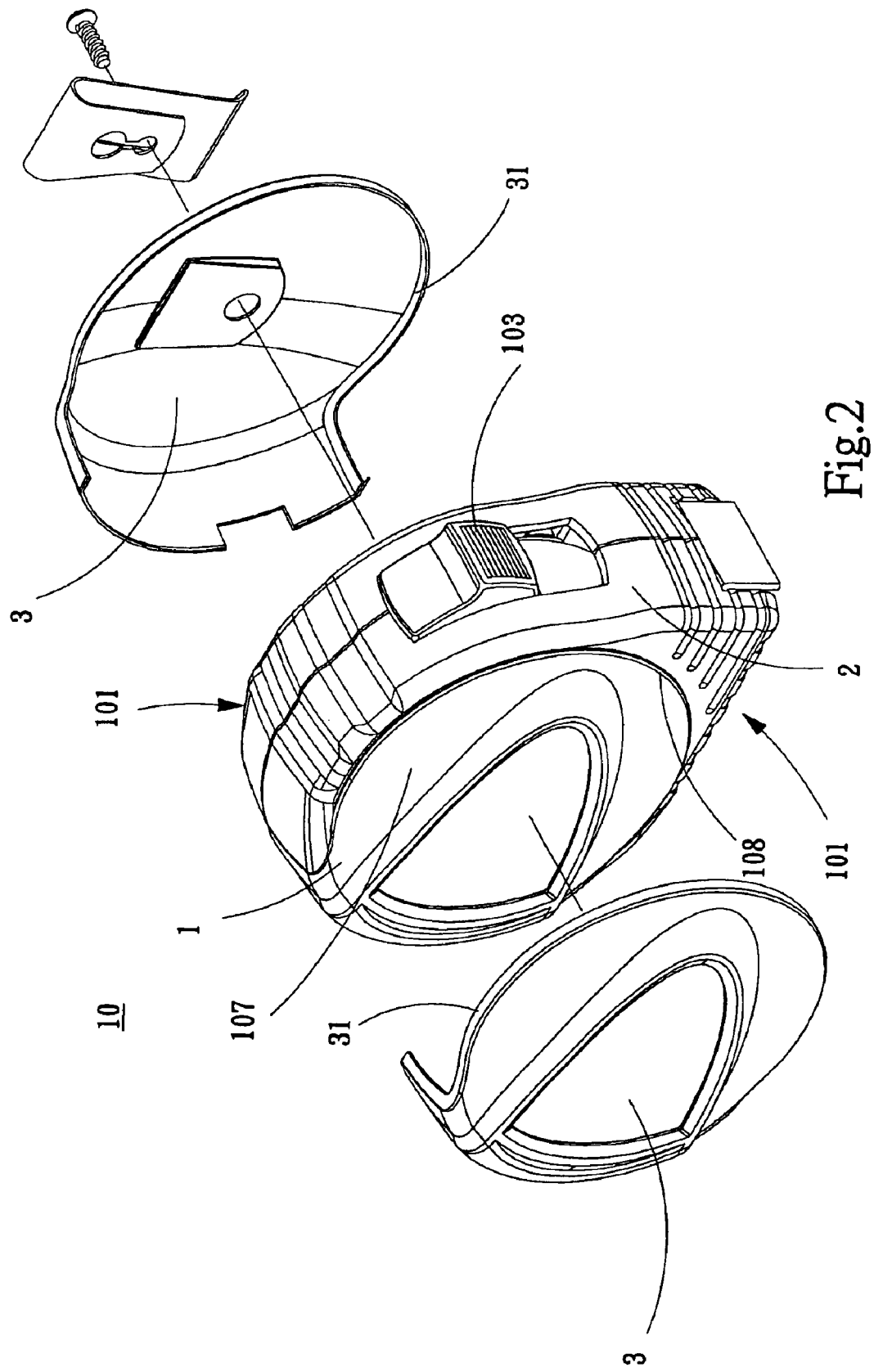
FIG. 2 is a partial assembly view of the present invention.
Figure 4:
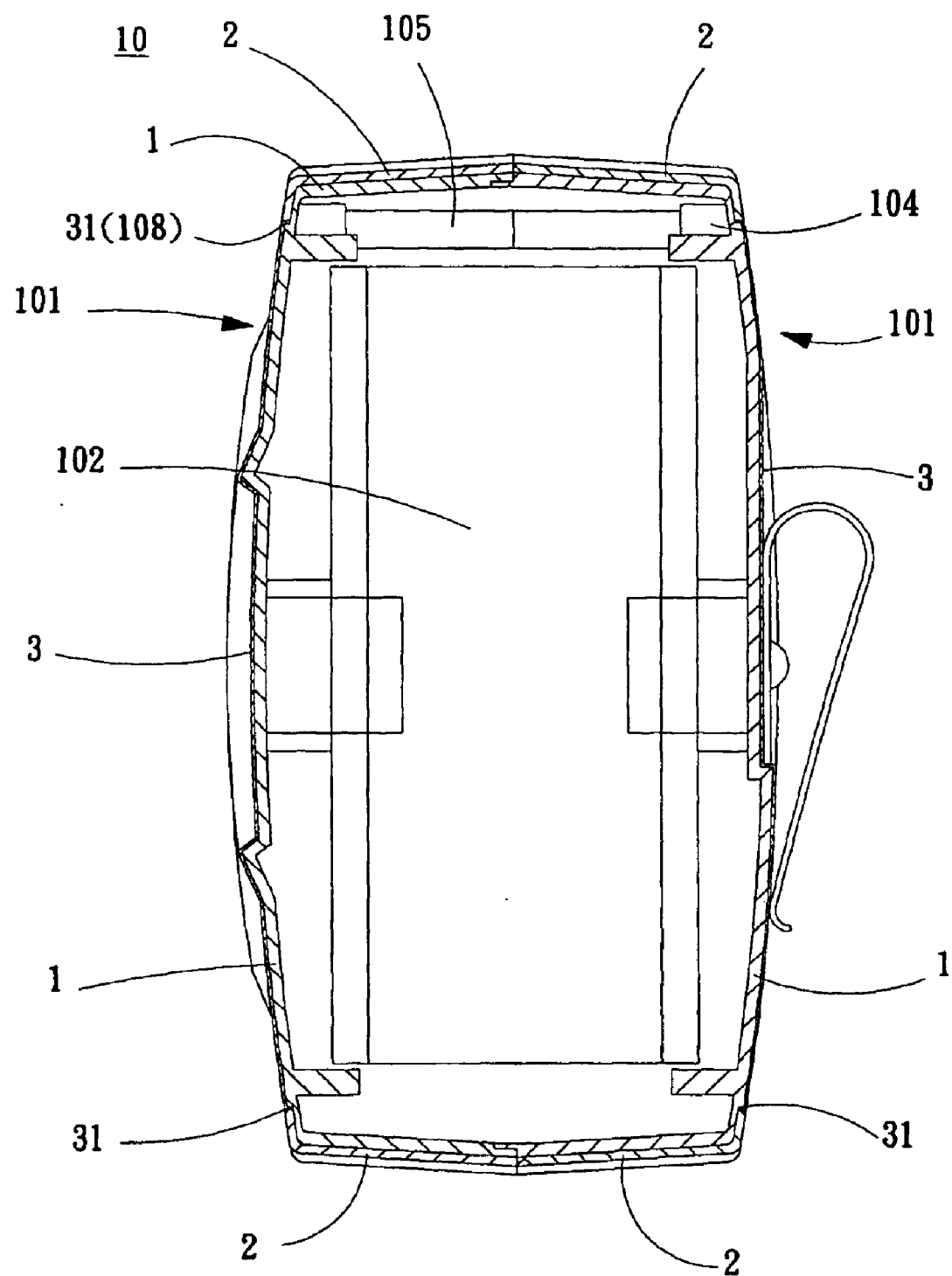
FIG. 4 is a cross-sectional view of the present invention.
Figure 6:
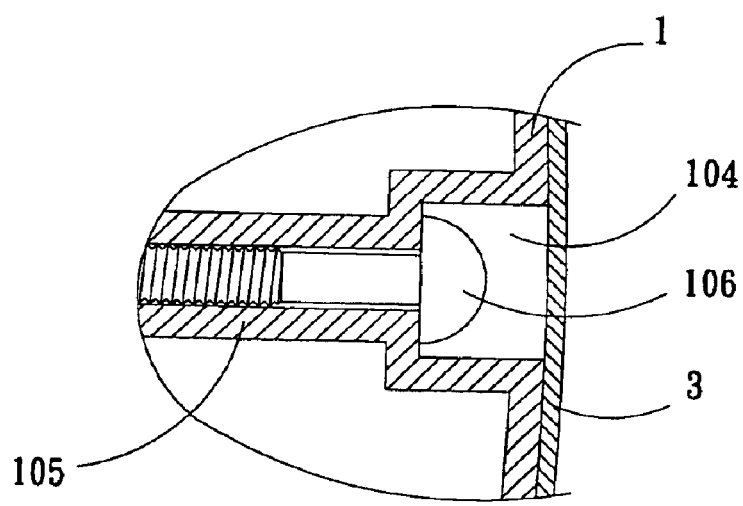
FIG. 6 is an enlarged view of the screw hole and the right, left body in accordance with the present invention.

Referring to FIG. 1 and FIG. 2, the present invention applies of a supporting hard plastic shell (1), a buffer soft plastic shell (2) and two impact proof side metal cover (3) to constitute a right, left body (101) of a measuring tape (10); the right, left body (101) pack and screw a tape wheel (102), an elastic component, and a tape lock/automatic rewind switch (103) inside to be a measuring tape (10). The tape wheel (102), elastic component and the tape lock/automatic rewind switch (103) are the necessary components of the known measuring tapes and are not described (the tape wheel and elastic component are not shown in FIG. 1 and FIG. 2). The functions of each component are described below:

the supporting hard plastic shell (1) is made of hard plastic and the buffer soft plastic shell (2) is made of soft plastic. The supporting hard plastic shell (1) and the buffer soft plastic shell (2) can be injected together or stuck together after being injected separately for the right, left body (101) of the measuring tape (10). The buffer soft plastic shell (2) is an external part and the supporting hard plastic shell (1) is arranged on the inner layer of the right, left body (101). The supporting hard plastic shell (1) is used as the supporting structure of the right, left body (101) while the buffer soft plastic shell (2) is as the impact proof mechanism. Referring to FIG. 4 and FIG. 6, a plurality of screw holes (104) and corresponding tubes (105) in symmetry are provided on the right, left body (101) made of the supporting hard plastic shell (1) and the buffer soft plastic shell (2). The impact proof side metal cover (3) is made of aluminum by stamping to match up the outline shape of the right, left body (101).

Figure 3:
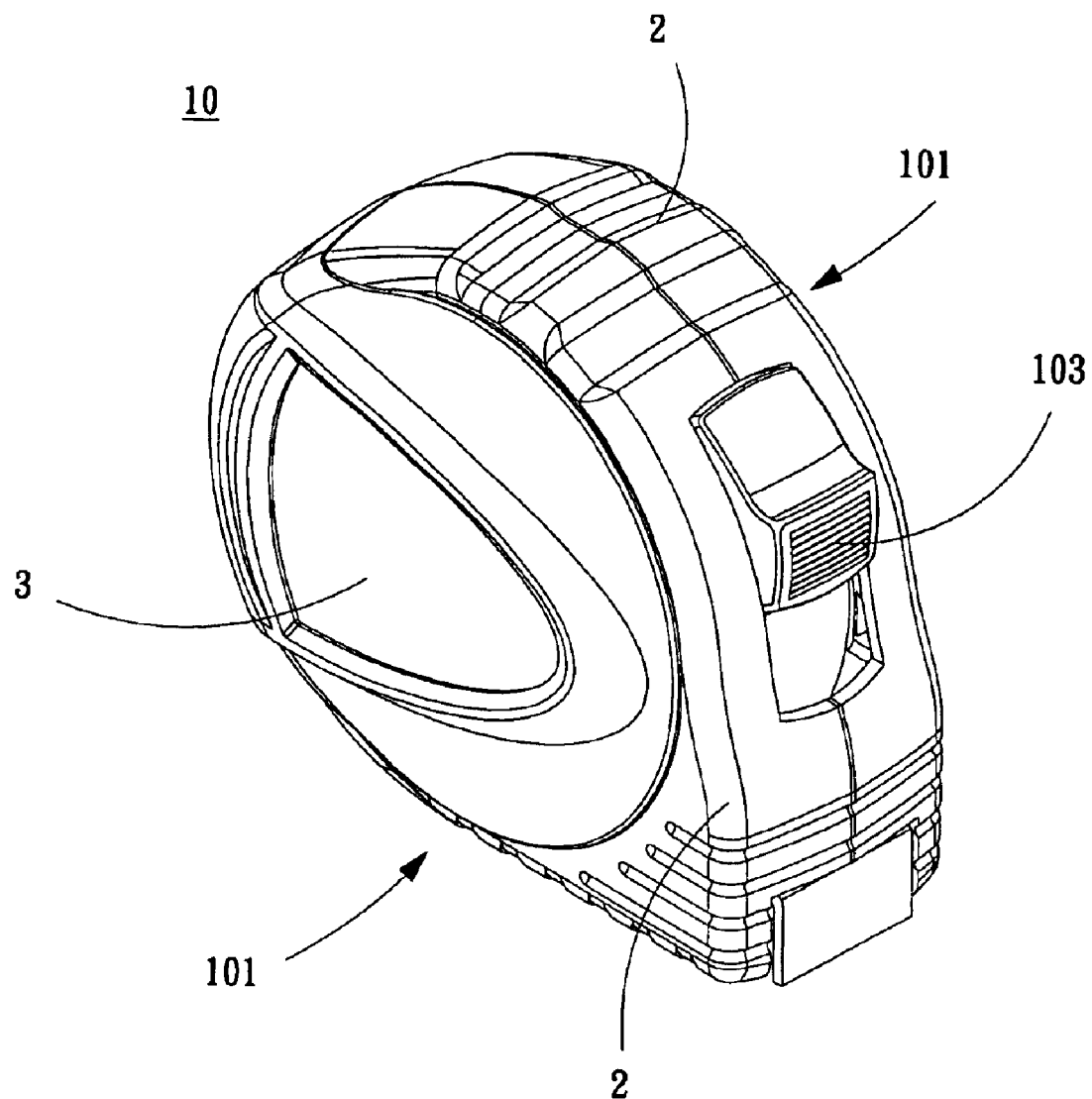
FIG. 3 is a perspective view of the present invention.

Based on above structure, during assembling, a screw (106) is applied in both directions to have the tape wheel (102), the elastic component, the tape lock/automatic rewind switch (103) and all the other components installed inside the right, left body (101), as shown in FIG. 2. Then cover the impact proof side metal cover (3) on both sides of the right, left body (101), as shown in FIG. 4. The screw hole (104) of the right, left body (101) are covered by the impact proof side metal cover (3), users cannot access the screw hole (104) to unlock those screw (106). Such structure, as shown in FIG. 3, make the measuring tape (10) impact proof, light weight and not easy to disperse.

The right, left body (101) have a slope curve (107) with indentation (108) on surrounding that is on the location corresponds to the impact proof side metal cover (3). A folding brim (31) is formed when the impact proof side metal cover (3) is made by stamping. Such arrangement can have the impact proof side metal cover (3) cover the slope curve (107) of the right, left body (101), the folding brim (31) inlay into the indentation (108) for better anti-impact strength.

Figure 5:
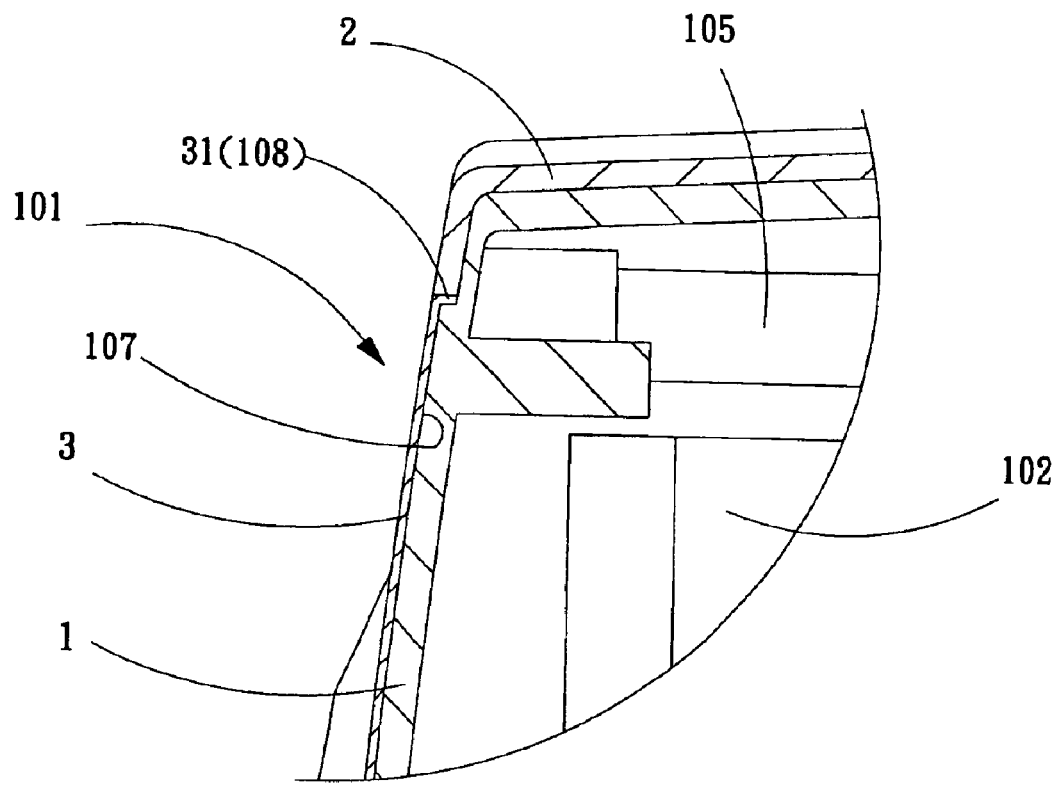
FIG. 5 is an enlarged view of the impact proof side metal cover and the right, left body in accordance with the present invention.

FIG. 5 shows the outer brink of the buffer soft plastic shell (2) of the measuring tape (10). To offer the best protection on the most often impact area of the measuring tape (10), the impact proof side metal cover (3) covers both sides of the measuring tape (10) that suffers most of grinding scratches to have the best protection. The impact proof side metal cover (3) shield the screw hole (104) that not only prevents those screw (106) from loosing but also offers a better appearance of the measuring tape (10). The right, left body (101) are made of soft, hard plastic materials, with the easy molding of plastic, the right, left body (101) can be in various appearance and protected by the impact proof side metal cover (3). Such scheme makes the measuring tape (10) easy for manufacturing.

While a preferred embodiment of the invention has been shown and described in detail, it will be readily understood and appreciated that numerous omissions, changes and additions may be made without departing from the spirit and scope of the invention.

What is claimed is:

1. A housing of measuring tape comprising:

a supporting hard plastic shell made of hard plastic and a buffer soft plastic shell made of soft plastic, said buffer soft plastic shell being an external part of said measuring tope and said supporting hard plastic shell being an inner layer to constitute a right and left body parts of the measuring tape;

two impact proof side metal covers made of aluminum by stamping to match up an outline shape of said right and left body parts, wherein during assembly, screws are applied to have all components of a measuring tape installed inside said right and left body parts, said impact proof side metal covers being installed on both external sides of said right and left body parts;

said supporting hard plastic shell and said buffer soft plastic shell being injected together to constitute said right and left body parts;

said impact proof side metal covers having a folding brim on an outer brink formed during stamping;

said right and left body parts having a slope curve with a surrounding indentation that is on the location corresponding to said impact proof side covers, said impact proof side metal covers covering said slope curve of said right and left body parts, folding brims inlaying into said indentations; and a plurality of screw holes and corresponding tubes being located symmetrically on said right and left body parts, said screw holes being covered by said impact proof side metal covers.

* * * * *